Aug. 31, 1965
C. J. MYERS
3,203,131
SELF-PROPELLED TROLLING DEVICE
Filed Nov. 2, 1962
2 Sheets-Sheet 1
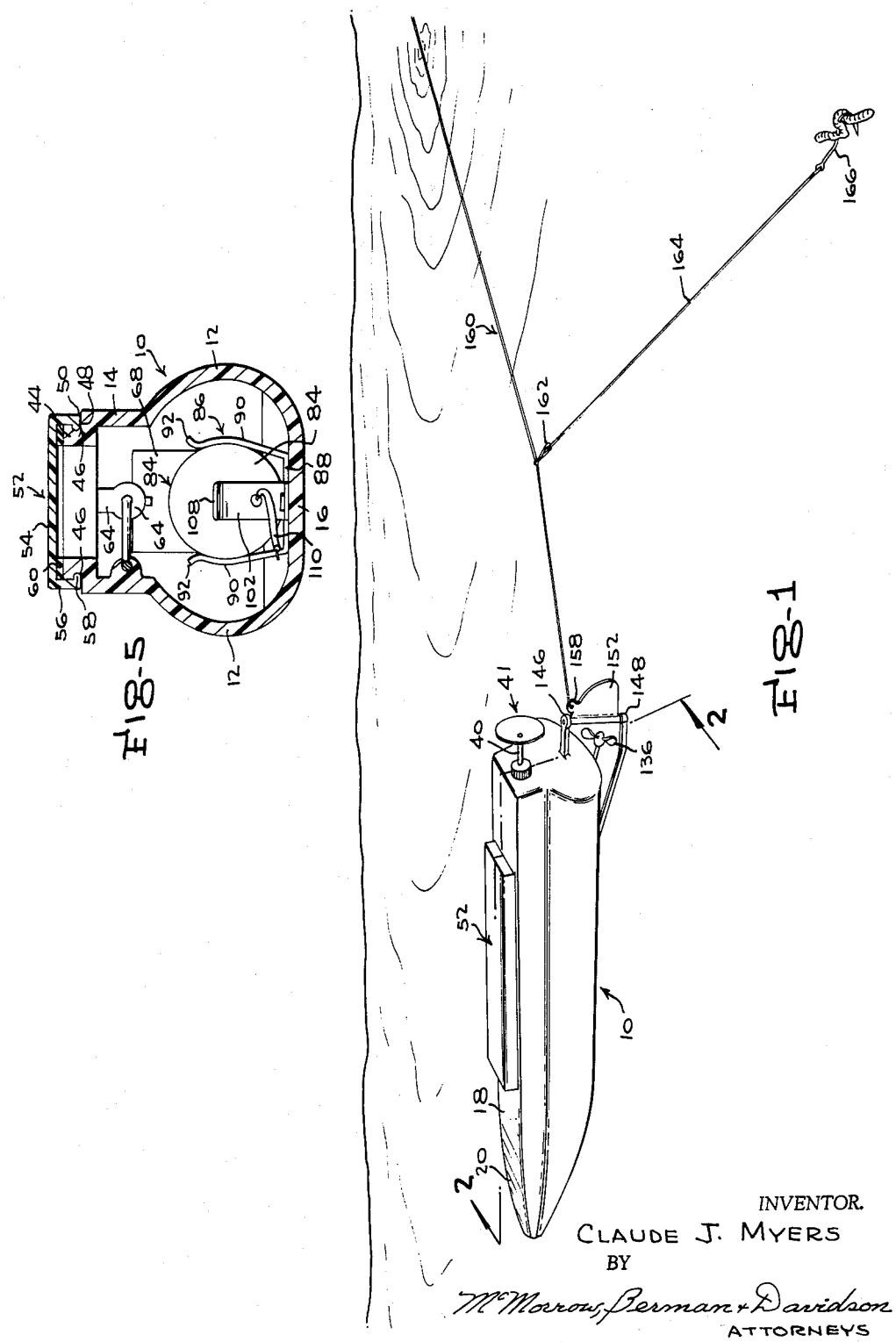
INVENTOR.
CLAUDE J. MYERS
BY
McMorrow, Berman & Davidson
ATTORNEYS

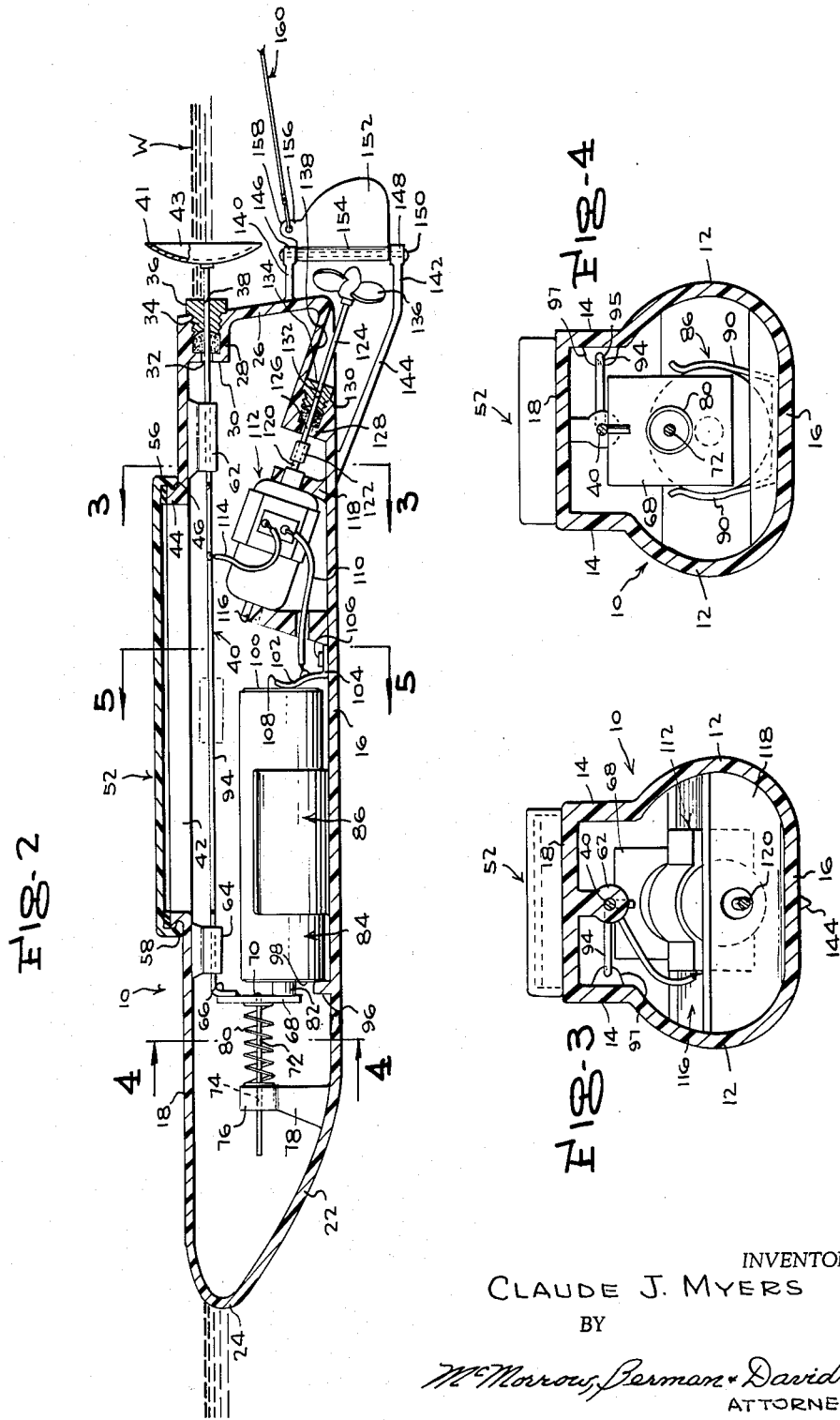

United States Patent Office 3,203,131
Patented Aug. 31, 1965

3,203,131
SELF-PROPELLED TROLLING DEVICE
Claude J. Myers, Stone Mountain, Ga.
(4165 Ballina Drive, Decatur, Ga.)
Filed Nov. 2, 1962, Ser. No. 235,077
8 Claims. (Cl. 43—26.1)

This invention relates to a novel self-propelled trolling device.

The primary object of the invention is the provision of a simpler, more practical, and more reliable device of the kind indicated, in which provision is made for shutting down its power unit, such as an electric motor, whenever the device is pulled in a reverse or back-up direction, either by the pull of a fish caught on its tackle or by a pull on the fishing line attached to the device, so that the loss of its propellant, during such times, otherwise involved, is advantageously precluded, whereby the usefulness and service of the device is materially extended.

Another object of the invention is the provision of a device of the character indicated above which has a rudder which is positively controlled by the fisherman through operative connection of the fishing line to the rudder, such connection being a dual-purpose means of attachment of the fishing line to the device.

A further object of the invention is the provision of a low-cost and economical device of the character indicated above which involves a minimum of uncomplex and easily assembled components, and which is readily adaptable to different forms and shapes of hull.

Other important objects and advantageous features of the invention will be apparent from the following description and the accompanying drawings, wherein, for purposes of illustration only, a specific form of the invention is set forth in detail.

In the drawings:

FIGURE 1 is a schematic perspective view showing a device of the present invention connected to a fishing line carrying a hook-equipped snell;

FIGURE 2 is an enlarged vertical longitudinal section taken on line 2—2 of FIGURE 1; and FIGURES 3, 4 and 5 are transverse vertical sections taken on the lines 3—3, 4—4, and 5—5, respectively of FIG. 2.

Referring in detail to the drawings, wherein like numerals designate like parts throughout the several views, the illustrated device comprises an elongated hollow hull 10, of suitable material such as molded plastic, the hull having side walls which are composed of laterally outwardly bowed low portions 12, jointed, at their upper edges, to upwardly extending parallel upper portions 14, and a flat bottom wall 16. The upper edges of the upper side wall portions 14 merge into the side edges of a flat top wall 18, which is substantially parallel to the bottom wall 16. The top wall 18 can be straight throughout its length, as shown in FIGURE 2, or be slightly downwardly angled, as indicated at 20, toward its forward end. This bottom wall 16 is upwardly angled, as indicated at 22, to its forward end, and the top and bottom wall joined, at their forward ends, by a rounded U-shaped prow 24, into which the hull side walls also merge.

The top, bottom, and side walls of the hull 10 merge, at their rear ends, into the transom 26, which is preferably disposed at a slight rearward and downward angle, as shown in FIGURE 2. A central upper area of the transom 26 is formed with a forwardly extending cylindrical socket 28 having a forward end wall 30, formed with a central opening 32. The rear end of the socket 28 is normally closed by a screw plug 34, having an enlarged knurled head 36, on its rear end. The plug 34 is formed with an axial bore 38, extending therethrough, the opening 32 and the bore 38 being provided to slidably support, therethrough, a horizontal switch operating rod 40, hereinafter more specifically described, having a convex-concave disc 41, fixed on its rear end, behind the transom 26, with its concave side 43 facing rearwardly.

Access to the interior of the hull 10 is provided through a longitudinally elongated rectangular opening 42, in the hull top wall 18, which is located closer to the transom 26 than to the prow 24. The access opening 42 is bounded by an upwardly extending flange 44, which, as shown in FIGURE 5, is inset from the upper side wall portions 14. The flange 44 is formed, entirely therearound, with an external groove 46, whose lower side 48 can be flush with the upper edges 50 of the upper side wall portions 14, as shown in FIGURE 5.

The closure or cover 52, for the access opening 42, comprises an inverted pan-shaped form having a flat top wall 54 and a continuous resilient peripheral flange 56, which is provided, at its lower edge, with a continuous internal locking bead 58, adapted to engage conformably in the groove 46 for locking the cover in place, the material of the cover affording sufficient resilience to provide for snapping the locking bead 58, into and out of the groove 46. To further assure a leakproof condition of the cover 52, a compressible sealing gasket 60 is provided, which overlies the upper edge of the access opening flange 44, and is compressed by the top wall 54 of the cover, when in place, the gasket 60 can be loose, but is preferably secured, in a suitable manner, either to the top wall of the cover or to the upper edge of the access opening flange.

The above mentioned switch operating rod 40 is preferably parallel to and spaced below and out of contact with the hull top wall 18, and is slidably supported through the bores of a tubular rear lug 62, disposed between the transom 26 and the access opening 42, and through the bore of a forward tubular lug 64, which is located forward of and near to the forward end of the access opening 42, the lugs 62 and 64 being located on the longitudinal centerline of the hull top wall 14. The rod 40 is longer than the distance between the forward end of the forward tubular lug 62 and the rear end of the socket plug 34.

The switch operating rod 40 has a pendant right-angular arm 66, on its forward end, to the forward side of which is suitably fixed the central upper part of a conductor contactor plate 68, which is substantially square, and of substantial dimensions. The contactor plate 68 is suitably fixed, as indicated at 70, to the rear end of a horizontal bar 72, which slides through a bore 74 provided in the upper end portion 76 of a standard 78 which is fixed to and rises from the hull bottom wall 16, at a location spaced forwardly from the forward tubular lug 64. An expanding coil spring 80 is circumposed on the bar 72 and is compressed between the standard 78 and the contactor plate 68, whereby the contractor plate, together with the switch operating rod 40, are constantly and yieldably urged in a rearward direction, tending to make electrical contact between the contactor plate 68 and the center contact 82 of a small dry battery 84, such as a flash light battery.

The battery 84 is supported in a horizontal longitudinal position in a U-shaped spring clip 86, having a flat bottom portion 88, engaged with the upper surface of the hull bottom wall 16, at a location behind the forward tubular lug 64, and is suitably fixed in place. The bottom portion 88 of the clip merges, at its side edges into upwardly and laterally outwardly bowed arms 90, having out-turned curved lips 92 along their upper edges, which facilitate insertion and removal of the battery 84 from the clip, through the access opening 42. As shown in FIGURES 3 and 4, the switch operating rod 40 has a laterally displaced portion 94, between the rear and forward tubular lugs 62 and 64, which provides clearance for the easy insertion and removal of the battery 84. The offset portion 94 slides in the groove 95 of a guide lug 97, on one of the upper hull side wall portions 14.

A transverse upstanding stop flange 96 is formed on the hull bottom wall 16, against which the forward end 98 of the battery 84 is adapted to be abutted, for properly positioning the battery. The battery has a base contact 100, on its rear end, which is constantly engaged by an upstanding conductive spring arm 102. The spring arm 102 includes a rearwardly extending portion 104, on its lower end, which is fixed, as indicated at 106, upon the hull bottom wall 16. The arm 102 is disposed at an upward and forward angle, is tensioned forwardly into engagement with the battery base contact 100, and has a rearwardly curved lip 108, on its upper end, which facilitates insertion and removal of the battery into engagement therewith. The spring arm 102 serves further to properly position the battery endwise into engagement with the stop flange 96, and together with the clip 86, serves to hold the battery securely against displacement and rattling when the device is thrown into the water and is operated in rough water.

The spring arm 102 is connected by an insulated wire 110, to one terminal of an electric motor 112, located behind the spring arm 102, and the other terminal of the motor is connected by an insulated wire 114, adjacent to the rear end of the offset portion 94 of the switch-operating rod 40, as shown in FIGURES 2 and 3.

The motor 112 is disposed centrally of the hull 10, and is supported in a rearwardly declining position, on and between a relatively tall forward post 116 and a relatively short rear post 118, the posts rising from the hull bottom wall 16 and being preferably integral therewith. The shaft 120 of the motor extends rearwardly, at a downward angle, and is connected, as indicated at 122, to the forward end of a similarly angled propeller shaft 124.

The propeller shaft 124 extends through an opening 126 provided in the forward end wall 128 of a rearwardly declining socket 130, and through the axial bore 132, of a screw plug 134, threaded into the open rear end of the socket 130, and reaches rearwardly of the transom 26, where it is provided with a propeller 136. The socket 130 is spaced forwardly from the transom 26 and is formed partly as a part of the hull bottom wall 16 and as a part of an upset, rearwardly declining channel 138, which reaches to and merges into the lower end of the transom 26.

The propeller 136 is guarded, top and bottom, by an upper horizontal rearwardly extending bar 140, which is suitably fixed at its front end to the transom 26, at a point spaced upwardly from the lower end thereof, and by a lower horizontal rearwardly extending bar 142, which constitutes the rear end portion of a rearwardly declining bar 144, which is suitably affixed, at its forward end, to the underside of the hull bottom wall 16, at a location spaced just forward and opposite, from the socket 130.

The upper and lower guard bars 140 and 142 have apertured heads 146 and 148, respectively, on their rear ends, through which are journaled the related ends of a perpendicular headed rudder shaft 150. A rudder 152 has a vertical tube 154 fixed on its forward edge, which is journaled on the shaft 150, between the heads 146 and 148, and an apertured lug 156 is fixed to the upper end of the rudder 150, at the upper end of the tube 154, and has an eye 158, in said lug, to which a fishing line 160 is adapted to be secured.

As shown in FIGURE 1, the fishing line 160 is provided, at a suitable distance behind the hull 10, with a loop 162 to which a snell 164 is secured, at one end, and has a fishhook 166 on its other end. Alternatively, in some cases, the snell could be attached to the hull 10.

In operation, the hull 10 is launched, in any suitable manner, in the water, so that the contactor plate 68 being rearwardly pressed against the center contact of the battery, and the motor thereby energized, and driving the propeller the device will move forwardly in the water, as away from the shore, and carry the baited fishhook 166 along in a trolling operation.

The device according to the instant invention is of the float type and so, only the top portion of the device, when launched upon a body of water, is above the water line indicated by the letter W in FIGURE 2. The device, after being launched, is steered by the operator on shore by suitable manipulation of the fishing line 160 to the right or to the left, this resulting in corresponding movement of the rudder 152 to which the line 160 is directly connected.

Whenever a fish takes the fishhook 166 and is snared thereon and pulls rearwardly thereon, relative to the hull 10, hard enough to move the hull rearwardly, or if the fisherman pulls on the fishing line to retrieve the hull, the rearward movement of the hull by virtue of the disc being mostly below the water line W causes the water to build up pressure against the concave rear surface 43 of the disc 41, such that the switch operating rod 40 is moved forwardly, against the resistance of the spring 80, whereby the contactor plate 68 is moved forwardly, away from the battery contact 82, and the electrical circuit to the motor 112 is broken, and the current drain on the battery 84 and the wear on the motor 112 and the propeller shaft 124 are precluded. In a period of dis-use, the motor is prevented from being energized by placing a flexible band so that it extends about and from the cover 52 to and about the concave side 43 of the disc 41.

Although there has been shown and described a preferred form of the invention, it is to be understood that the invention is not necessarily confined thereto, and that any change or changes in the structure of and in the relative arrangements of components thereof are contemplated as being with in the scope of the invention as defined by the claims appended hereto.

What is claimed is:

1. A self-powered trolling device comprising an elongated hollow hull having bottom and top walls, side walls, a prow, and a transom, an electric motor provided with a pair of terminals and mounted within the hull and having a rearwardly extending motor shaft, a rearwardly extending propeller shaft journaled through the hull and having a propeller on its rear end, said propeller shaft being connected at its forward end to the motor shaft, a battery supported within the hull forwardly of the motor and having a contact electrically connected to one terminal of the motor, switch means supported within the hull forwardly of the battery, said switch means comprising a contactor plate spring-pressed to engagement with the other contact of the battery, and a switch operating rod slidably supported within the hull and having a rear end portion extending rearwardly beyond the transom, a water-pressure disc fixed on the switch operating rod behind the transom, a rudder behind the transom and located below and spaced from said disc and carried by the transom, a fishing line attached to said rudder, said rod being operatively connected to said contactor plate, said rod being connected to the other terminal of the motor, said rod normally being in a position wherein the contactor plate is engaged with said other battery contact, said rod being adapted to be moved forwardly to move the contactor plate away from said other battery contact for deenergizing the motor whenever the hull is moved rearwardly in the water by pull exerted on the fishing line either by the fisherman or by a fish snared on the fishhook.

2. The self-powered trolling device according to claim 1 wherein said rudder is journaled on a vertical axis on the transom and positioned behind the propeller, said rudder having an apertured lug to which the fishing line is secured.

3. The self-powered trolling device according to claim 1 wherein said switch means further comprises a vertical standard secured to the hull and having a horizontal bore extending therethrough, a bar sliding rearwardly through said bore, said contactor plate being fixed to the rear end of the bar, and spring means compressed between said standard and said contactor plate.

4. The self-powered trolling device according to claim 1 wherein said transom is formed with forwardly extending socket having a forward end wall provided with an opening, a plug removably secured in the rear end of the socket and formed with an axial bore, said switch operating rod extending slidably through said opening and the bore of the plug.

5. The self-powered trolling device according to claim 4 wherein said hull bottom wall has an upset channel extending to the transom, another socket formed in said bottom wall and said channel and having a forward end wall formed with an opening through which the propeller shaft extends, a removable plug closing the rear end of said other socket and having an axial bore through which the propeller shaft is jounaled.

6. The self-powered trolling device according to claim 2 wherein said rudder is jounaled on a vertical axis on the transom and positioned behind the propeller, said rudder having a rearwardly extending steering arm to which the fishing line is secured, a lower horizontal guard bar beneath the propeller and mounted to the hull bottom wall, an upper guard bar above the propeller and mounted to the transom, said rudder being disposed between and journaled on the upper and lower guard bars at the rear ends thereof.

7. The self-powered trolling device according to claim 1 wherein said hull top wall has an access opening in the region of the battery, an upstanding flange surrounding the access opening and having an external locking groove, a pan-shaped removable cover having a top wall and a resilient pendant peripheral flange adapted to engage over the access opening flange, said peripheral flange having an internal locking head adapted to snap into and out of the locking groove.

8. The self-powered trolling device according to claim 7 which includes in addition a compressible sealing gasket interposed under pressure between the upper edge of the access opening flange and the cover top wall.

References Cited by the Examiner

UNITED STATES PATENTS

| | | | |
|---|---|---|---|
| 787,344 | 8/05 | Holz et al. | 43—26.1 |
| 1,850,296 | 3/32 | Vermeulen | 43—26.1 |
| 2,693,047 | 11/54 | Lumsden | 43—26.1 |
| 2,709,316 | 5/55 | McCabe | 43—26.1 |

SAMUEL KOREN, *Primary Examiner.*

JOSEPH S. REICH, *Examiner.*